Patented Mar. 28, 1950

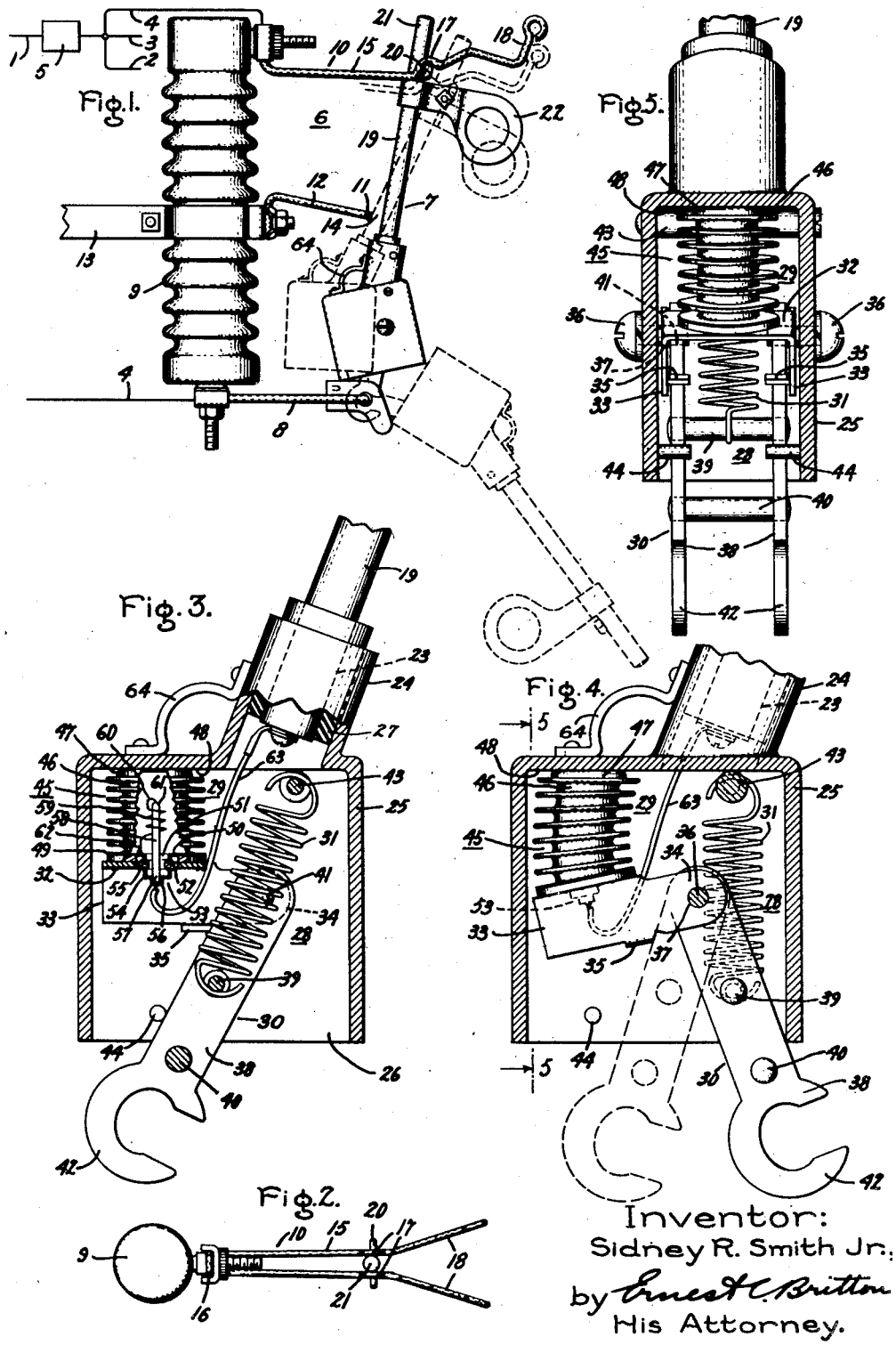

2,502,179

UNITED STATES PATENT OFFICE 2,502,179

COMBINATION OVERCURRENT AND OVERVOLTAGE PROTECTIVE DEVICE

Sidney R. Smith, Jr., Pittsfield, Mass., assignor to General Electric Company, a corporation of New York Application May 11, 1949, Serial No. 92,648

3 Claims. (Cl. 200—115)

This invention relates to protective devices for electrical circuits and more particularly to a combination overvoltage and overcurrent protective device such as may be used to protect electrical distribution power lines against damage from short circuits and arcing faults between the line conductors or overcurrent in a transformer located in one of the power lines.

In a typical electrical distribution system electrical power may be transmitted at high voltage from a distant source of electrical power to a distribution transformer which reduces the voltage to a relatively low value for transmittal through main feeder circuit power distribution lines to several branch feeder circuits. In such a system it is general practice to protect the feeder circuits by employing time-delay overcurrent relays for tripping a breaker supplying power to a feeder line, and reclosing equipment for obtaining one or more timed reclosures prior to a lockout in the case of a permanent fault. Such a circuit breaker is called a time-delay reclosing circuit breaker. Thus, in theory, for purely transient faults the reclosing breaker would clear a temporary fault after one or more reclosures and place the feeder lines in operation again. The ability to thus maintain the main feeder circuits in operation by means of the reclosing circuit breakers is a definite advantage in continuity of service, particularly in view of the fact that a large percentage of the electrical faults are purely transient being due to such causes as lightning flashovers, line conductors momentarily swinging together, and small conductors falling across the wires.

However, the power arc that is initiated by the transient fault frequently causes damage to the line conductor. Moreover, where the fault is permanent and on a branch circuit, the reclosing circuit breaker eventually times out and remains open thus interrupting service on the complete feeder system including branch circuits on which there is no electrical fault.

It is an object of this invention to provide a protective device which may be used in a branch feeder circuit or the like to reduce damage to the conductors therein otherwise resulting from overvoltage.

It is a further object to provide in the same device an arrangement of overcurrent protection which reduces damage to the protected circuit otherwise resulting from an electrical fault on the same.

A still further object of my invention is to provide in the same device an arrangement adapted to cooperate with a reclosing circuit breaker to isolate that portion of an electrical system having an electrical fault in order that electrical service may be continued on the remaining portion.

In general my invention comprises a grounding and disconnecting member held between two conductor terminals secured to opposite ends of an insulator, and a grounding member, the grounding and disconnecting member comprising a disconnecting blade, a current responsive trip member, and a toggle mechanism cooperatively arranged to provide overcurrent and overvoltage protection to a circuit connected thereto and to isolate the circuit upon a fault condition causing overcurrent therein.

For a complete understanding of my invention reference should be had to the folowing specification and the accompanying drawing wherein Fig. 1 is a side elevational view of a device illustrative of my invention shown connected in an electrical circuit; Fig. 2 is a top elevational view of a portion of the device of Fig. 1; Fig. 3 is a side elevational view of another portion of Fig. 1 showing the toggle mechanism in closed position; Fig. 4 is a side elevational view of a portion of Fig. 1 showing the toggle mechanism in opening position, and Fig. 5 is an elevational view taken on line 5—5 of Fig. 4.

Referring to the drawing, I have shown in Fig. 1 in diagrammatical form a main feeder circuit 1 arranged to supply electrical power to a plurality of feeder circuits 2, 3, and 4 and supplied with electrical power from a power source indicated through a reclosing circuit breaker 5 in main feeder circuit 1. In such a system it is desirable to isolate a branch circuit, such as branch circuit 4, for example, upon the occurrence of a permanent electrical fault thereon in order that service may be continued through the breaker 5 to circuits 2 and 3. It is also desirable to reduce the voltage on a circuit having an electrical fault as rapidly as possible to prevent damage therein. It is further desirable to prevent the reapplication of voltage to an electrical circuit having an electrical fault to avoid additional damage to the circuit.

To accomplish the above in accordance with my invention I provide a combination overvoltage and overcurrent protective device 6 in each of the branch circuits. To simplify the drawing, I have shown device 6 only in branch circuit 4 with the understanding that similar devices may be applied to branch circuits 2 and 3.

Device 6, as shown in Fig. 1, comprises a disconnecting and grounding member 7 pivotally supported on a conductor terminal 8 connected to one end of an elongated insulator 9, and releasably biased in closed position against a resilient conductor terminal 10, which is connected to the other end of insulator 9. Member 7, when closed, is in spaced relation with the projecting end 11 of a grounding conductor 12, which conductor is electrically connected to a grounded hanger 13 arranged to support the insulator 9, as shown in Fig. 1. The spaced relation of member 7 and the projecting end 11 of grounding conductor 12 forms an air gap 14 of predetermined length. Thus, when an overvoltage is applied to member 7 such voltage produces an arc across air gap 14 thereby grounding member 7, reducing the voltage on circuit 4 and preventing a flashover on another portion of circuit 4. Such grounding also causes circuit breaker 5 to interrupt the electrical power supply to device 6 and to branch circuit 4.

In the event of an overcurrent on branch circuit 4 resulting from an electrical fault thereon, member 7 is arranged to engage grounding conductor 12 to reduce the voltage on branch circuit 4, extinguish an arc at the portion of the circuit having the electrical fault and cause circuit breaker 5 to interrupt the circuit. Thereafter member 7 swings in a clockwise direction about its pivoted connection to conductor terminal 8 thus isolating circuit 4 and allowing the reclosing circuit breaker 5, upon reclosing, to remain closed to continue service to branch circuits 2 and 3 which have no electrical fault.

Thus, by application of device 6 to branch circuit 4 overvoltage and overcurrent protection is provided for circuit 4 thereby eliminating continued arcing and damage to the portion of the circuit having an electrical fault. In addition, upon the occurrence of an overcurrent caused by a temporary or permanent fault on branch circuit 4 the circuit is grounded to eliminate the arc at the portion of the circuit having the electrical fault, and the circuit is isolated to allow circuit breaker 5 upon reclosing to continue service to lines 2 and 3.

For a complete understanding of the structure and operation of device 6, attention is directed to Figs. 1-5 in order. As shown in Fig. 1, the grounding and disconnecting member 7, when closed, is held between terminals 8 and 10 of device 6. Resilient conductor terminal 8 is formed of a rigid conductor wire or other suitable material and is secured to insulator 9 as shown in Fig. 1. The projecting end of terminal 8 is bent at a right angle and lies in a plane perpendicular to the longitudinal axis of insulator 9 to form a pivot support for the grounding and disconnecting member 7. Resilient conductor terminal 10 is formed of a length of resilient conducting wire or other suitable material shaped to form two identical diverging arms 15 having an annular portion 16 angularly disposed to the adjacent portion of arms 15, and diverging angularly disposed ends 18 as shown in Figs. 1 and 2. Bends 17 are formed in the arms 15 of terminal 10 adjacent to the diverging ends 18 thereof, as shown in Figs. 1 and 2, and the projecting end 11 of the grounding conductor 12 is bent at a right angle to lie in a plane perpendicular to the longitudinal axis of insulator 9.

The grounding and disconnecting member 7 comprises a cylindrical elongated metallic disconnecting blade 19 having a bow-shaped pin 20 made of suitable conducting material secured adjacent to end 21 thereof, and a switchstick hook 22 secured to blade 19 adjacent to pin 20 as shown in Fig. 1. The other end 23 of blade 19 is rigidly connected to a tubular portion 24 of a hollow housing 25 having one open end 26 as shown in Fig. 3. A bushing 27 of any suitable insulating material is positioned on end 23 of blade 19 as shown in Fig. 3 to insulate blade 19 from housing 25. The tubular portion 24 of housing 25 is formed at an angle to the vertical axis thereof for a reason to be explained in detail later.

Enclosed within housing 25 is a spring biased toggle mechanism 28 comprising an actuating member 29, an actuated member 30, and a tension spring 31 as shown in Figs. 3, 4 and 5. Toggle mechanism 28 is made of any suitable electrical conducting material such as steel. Actuating member 29 has a main body portion 32, two parallel sides 33 perpendicular to body portion 32 and disposed on one side thereof. The sides 33 of actuating member 29 are larger than the main body portion 32 forming two projecting ends 34, and are provided with inwardly disposed actuating ears 35 as shown in Figs. 3-5. Actuating member 29 is pivotally connected to housing 25 as shown in Fig. 5 by two pivot screws 36 passing through aligned apertures 37 in the projecting ends 34 of actuating member 29, or by other suitable means. Actuated member 30 comprises two parallel arms 38 connected by support pins 39 and 40 as shown in Fig. 5 to form a rigid structure. One end of actuated member 30 is pivotally connected to housing 25 by pivot screws 36 passing through aligned apertures 41 in actuated member 30. The other end of actuated member 30 is shaped to form two symmetrical hooks 42 as shown in Figs. 3-5. One end of tension spring 31 is connected to support pin 39 and the other end is connected to a pin 43 positioned transversely in housing 25 and secured thereto by any suitable means as shown in Figs. 4 and 5. A stop pin 44 is provided in each side of housing 25, as shown in Figs. 4 and 5 to limit the clockwise rotation of actuated member 30 about pivot screws 36. Mounted upon the main body portion 32 of actuating member 29 is a bellows type over current tripping mechanism 45. Tripping mechanism 45 comprises a bellows 46 made of suitable conducting material and filled with an expansible gas. A closed end 47 of bellows 46 engages an inside surface 48 of the housing 25. The other end 49 of bellows 46 has a flanged portion 50 centrally located therein and forming an aperture 51. Flanged portion 50 protrudes through an aperture 52 in the main body portion 32 of actuating member 29. A terminal 53 having a flanged portion 54 of diameter equal to the diameter of flange portion 50 is secured to the bellows 46 by an insulating bushing 55 made of glass or other suitable material to electrically insulate the terminal 53 from the bellows 46. Terminal 53 is also provided with a recessed portion 56 to accommodate one end 57 of a conducting member 58 and to electrically and mechanically secure conducting member 58 to the terminal 53. Conducting member 58 acts as a support for a heater element 59 which is positioned thereon as shown in Fig. 3. One end 60 of the heater element is electrically connected to an end 61 of the conducting member 58 and the other end 62 of the heater element 59 is electrically connected to end 49 of bellows 46. Electrical energy is supplied to the heater through a conductor 63 which is electrically connected between the terminal 53 and end 23 of blade 19 by any suitable means.

The disconnecting and grounding member 7 is connected to conductor terminal 8 by attaching the hooked end 42 of actuated member 30 thereto, as shown in Fig. 1. In the closed position of device 6 end 21 of blade 19 is held between the diverging arms 15 of resilient conductor terminal 10 and pin 20 is held in bends 17 of terminal 10. Grounding and disconnecting member 7 is then in the full line closed position shown in Fig. 1 and is angularly disposed with respect to the longitudinal axis of insulator 9 as shown in Fig. 1.

To illustrate the operation of device 6, attention is directed to Figs. 1, 3 and 4 in order. In Fig. 1 the full-line drawing of the grounding and disconnecting member 7 shows that member in closed position thereby electrically connecting terminals 10 and 8 through the medium of disconnecting and grounding blade 19, trip mechanism 45, and the spring biased toggle mechanism 28. Device 6, when closed, supplies power to branch circuit 4.

Assuming an overvoltage condition on branch circuit 4 caused, for example, by lightning, such overvoltage produces an arc across air gap 14 thereby grounding blade 19 through the medium of grounding conductor 12 and grounded hanger 13. This prevents an arc being produced on some other portion of circuit 4 and causing damage therein. Thus, device 6 provides overvoltage protection for branch circuit 4.

Next, assuming an overcurrent condition on branch circuit 4, such overcurrent flows through heater element 59 of the bellows trip mechanism 45 and the heat produced thereby causes the fluid in bellows 46 to expand. Bellows 46 in expanding exerts a force against surface 48 of housing 25 and the main body portion 32 of actuating member 29 thereby causing actuating member 29 to move in a counterclockwise direction about pivot screws 36 and causing the actuating ears 35 of actuating member 29 to engage actuated member 30 to rotate member 30 in a counterclockwise direction about pivot screws 36, as shown in Fig. 4.

When actuated member 30 has been pivoted in a counterclockwise direction a sufficient distance to allow the longitudinal axis of spring 31 to pass over-center of pivot screws 36, the tension of spring 31 continues the counterclockwise rotation of actuated member 30. At the same time that actuated member 30 is being rotated in a counterclockwise direction about pivot screws 36, it is also rotating in a counterclockwise direction about its hooked end 42 which is pivoted to conductor terminal 8. This counterclockwise rotation of actuated member 30 causes the housing 25 to move to the left causing blade 19 to engage grounding terminal 12. As housing 25 continues to move to the left, pin 20 of blade 19 is forced out of engagement with bends 17 of resilient conductor terminal 10 and at this point the grounding and disconnecting member 7 has reached the dotted position between terminals 8 and 10 as shown in Fig. 1.

The electrical result of the movement of member 7 so far has been the grounding of device 6, and therefore of circuit 4, and a time-delayed release of blade 19 from resilient conductor terminal 10. The grounding of branch circuit 4 lowers the voltage on the circuit to prevent further current being supplied to an electrical fault on the circuit and prevents additional damage or danger to the conductors of circuit 4. The reason for the angular position of tubular portion 24 of housing 25 with respect to the vertical axis of housing 25 is to permit sufficient movement of actuated member 30 within housing 25 to allow the grounding of blade 19.

It will be noted that when housing 25 has moved to the left a sufficient amount to cause blade 19 to engage grounding conductor 12 the projecting end 21 of blade 19 is still held between the arms 15 of resilient conductor terminal 10 and pin 20 is still engaged in bends 17 of terminal 10. As housing 25 is moved further to the left a lever action of blade 19 on grounding conductor 12 forces the free end of resilient terminal 10 upward and forces the end 21 of blade 19 to the right thereby disconnecting pin 20 from bends 17. During this movement there is a wiping action of end 21 of blade 19 on resilient conductor terminal 10 which affords a time delay in disconnecting blade 19 from resilient conductor terminal 10.

This time delay affords the circuit breaker 5 sufficient time to interrupt the supply of current to branch circuit 4, and the disconnecting and grounding member 7 then falls by gravity to the dotted position at the lower right of Fig. 1. Thus device 6 in addition to providing overvoltage and overcurrent protection of branch circuit 4 also isolates branch circuit 4, in response to an overcurrent condition caused by an electrical fault on branch circuit 4, to enable reclosing circuit breaker 5 upon reclosing to continue service on the remaining branch circuits 2 and 3. A second switchstick hook 64 is connected to the housing 25 to provide a means for removing the grounding and disconnecting member 7 to reset the tripping mechanism when the device is to be placed in operation again.

Device 6 may also be used to protect a transformer electrically connected to the main circuit 1 through device 6 and forming a part of a branch feeder circuit. For example, if a transformer is electrically connected to main feeder circuit 1 through device 6 and such an electrical fault occurs in a winding of the transformer as to produce an overcurrent of sufficient value to eventually cause damage to the transformer but not of sufficient value to trip the reclosing breaker 5 in the main feeder 1, then, device 6 may be set to operate in response to such a current to place a ground on feeder 1 causing circuit breaker 5 to interrupt the supply of current to the transformer and allow device 6 to isolate the transformer from the feeder 1.

While I have shown and described a particular embodiment of my invention, it will be obvious to those skilled in the art that various changes and modifications may be made without departing from my invention in its broader aspects and I, therefore, aim in the appended claims to cover all such changes and modifications as fall within the true spirit and scope of my invention.

What I claim as new and desire to secure by Letters Patent of the United States is:

1. A combined overcurrent and overvoltage protective device for an electric circuit comprising an insulator, a disconnecting blade, two spaced electrical conductor terminals supported by said insulator and electrically connected in series with said blade, releasable holding means securing one end of said blade against one of said conductor terminals, a grounding conductor normally spaced a predetermined distance from said disconnecting blade to ground said device when an overvoltage of a predetermined value is applied thereto, a spring toggle mechanism mechanically connected to the other end of said blade and pivotally connected to the other of said conductor terminals for effecting movement of said disconnecting blade first into contact with said grounding conductor then to cause said blade to cooperate with said releasable holding means for a predetermined time interval and thereafter to effect disengagement of said blade from said one of said electrical conductor terminals, and current responsive tripping means for actuating said toggle mechanism.

2. A combined overcurrent and over voltage protective device for an electric circuit comprising an elongated insulator, a disconnecting blade, a resilient conductor terminal having one end thereof mounted on one end of said insulator and its other end projecting therefrom, a second conductor terminal having one end mounted on the other end of said insulator and its other end projecting therefrom, said conductor terminals being substantially parallel and electrically connected in series with said blade, releasable holding means securing one end of said blade against said resilient conductor terminal, a grounded hanger positioned between the opposite ends of said insulator and secured thereto, a grounding conductor having one end mounted on said hanger and its other end projecting from said insulator and normally spaced from said disconnecting blade, a spring toggle mechanism mechanically connected to and electrically insulated from the other end of said blade and pivotally connected to said second conductor terminal for effecting movement of said disconnecting blade first into contact with said projecting end of said grounding conductor then to cause said blade to cooperate with said releasable holding means for a predetermined time interval and thereafter to affect disengagement of said blade from said resilient conductor terminal, and current responsive tripping means electrically connected between said blade and said toggle mechanism for actuating said toggle mechanism.

3. A combined overcurrent and overvoltage protective device for an electrical circuit comprising an insulator, two spaced electrical conductor terminals supported by said insulator, a grounding and disconnecting member comprising a disconnecting blade a tripping mechanism and a toggle mechanism electrically interconnected in a series electrical circuit and mechanically interconnected, said blade being insulated from said toggle mechanism to cause an electrical current to pass through said tripping mechanism, said grounding and disconnecting member being pivotally connected to one of said spaced conductor terminals through said toggle mechanism and releasably held in engagement with the other of said spaced conductor terminals through said disconnecting blade to electrically interconnect said space conductor terminals in the normal closed position of said grounding and disconnecting member, a grounding conductor supported in fixed position and normally spaced from said disconnecting blade to ground said disconnecting blade in the event of an overvoltage of predetermined value on said device, said toggle mechanism being arranged upon actuation by said tripping mechanism in response to an overcurrent therein to cause said blade to engage said grounding conductor to ground said device for a predetermined time interval thereafter to effect disengagement of said blade from the other of said electrical conductor terminals to electrically disconnect the spaced conductor terminals.

SIDNEY R. SMITH, JR.

No references cited.